Jan. 28, 1969    M. W. STARK    3,423,943
HYBRID ROCKET MOTOR
Filed Feb. 27, 1967

INVENTOR.
MARVIN W. STARK

United States Patent Office 3,423,943
Patented Jan. 28, 1969

3,423,943
HYBRID ROCKET MOTOR
Marvin W. Stark, San Jose, Calif., assignor, by mesne assignments, to the United States of America as represented by the Secretary of the Navy
Filed Feb. 27, 1967, Ser. No. 619,543
U.S. Cl. 60—251      2 Claims
Int. Cl. F02k 9/06; F42b 9/14, 5/16

ABSTRACT OF THE DISCLOSURE

A hybrid rocket motor in which high impulse efficiency is achieved by causing a complete intermixing of liquid oxidizer and solid fuel in the rocket combustion chamber. This is brought about by forming a plurality of orifices, or port restrictions, which interrupt what would otherwise be a steady gas flow through the motor core and produce a turbulence which breaks down the boundary layer adjacent to the surface of the solid propellant and brings the oxidizer into intimate contact with the burning surface of the fuel. In a preferred embodiment of the invention, these orifices or port restrictions are themselves composed of the same material as that constituting the solid fuel, so that they not only increase the performance of the rocket but bring about this improvement without imposing a weight penalty which, when present, detracts from the range and/or maneuverability of the projectile.

---

The invention described herein may be manufactured and used by or for the Government of the United States of America for governmental purposes without the payment of any royalties thereon or therefor.

*Background of the invention*

The present invention lies in the field of hybrid rocket motors. Such assemblies (which are customarily made up of a solid fuel and a liquid oxidizer) have in the past possessed inherently poor impulse efficiency due to insufficient mixing of the oxidizer and fuel in the motor combustion chamber. In systems of the type under discussion, the oxidizer in liquid form enters the grain at the forward end of the combustion chamber, whereas the fuel is supplied by vaporization from the grain surface. Consequently, there exists a fuel-rich annulus (in the form of a boundary layer adjacent the burning surface of the grain) and an oxidizer-rich central core region. In other words, the liquid phase tends to produce a concentration of oxidizer along the axis of the core that is substantially higher than the percentage of oxidizer found in the region proximate to the fuel grain. As a result, combustion of the solid phase is less than a maximum.

*Summary of the invention*

The present invention has as one of its principal objectives the improvement of hybrid rocket motor performance by eliminating the tendency of the liquid oxidizer to become concentrated along the axis of the motor core. To achieve this effect, the present invention contemplates the employment of a plurality of orifices, or port restrictions, spaced apart from one another along the motor axis and tending to interrupt the steady flow of liquid oxidizer through the motor combustion chamber. The function of these port restrictions (or discontinuities) in what would otherwise be a generally smooth grain surface is to form a partial barrier to the gas flow through the motor core and hence create a partial recirculating effect which brings about a thorough mixing of all of the gaseous components within each region formed by adjacent barriers or restrictions. This gas turbulence effectively breaks down any boundary layer which might otherwise form adjacent the burning surface of the solid fuel, inasmuch as the turbulent gases created in the manner set forth above include cross currents which possess at least in part an outward radial component which directs the oxidizer toward the burning fuel surface and produces an intimate contact therebetween. The end result is that the solid and liquid phases are thoroughly intermixed in the combustion chamber per se rather than having this complete intermixing postponed until the exhaust nozzle region of the rocket is reached, as has been the case in many prior designs.

A principal objective of the present invention, therefore, is to increase the efficiency of operation of a hybrid rocket motor of the type employing as a propellant a solid fuel and a liquid oxidizer.

Another object of the invention is to provide an improved form of hybrid rocket design in which the oxidizer-rich and fuel-rich gases are thoroughly intermixed within the motor core region so that complete combustion takes place within such region rather than in the nozzle of the projectile or even in the exhaust plume.

Other objects, advantages, and novel features of the invention will become apparent from the following detailed description of the invention when considered in conjunction with the accompanying drawings wherein:

*Description of the preferred embodiment*

Figure 1:
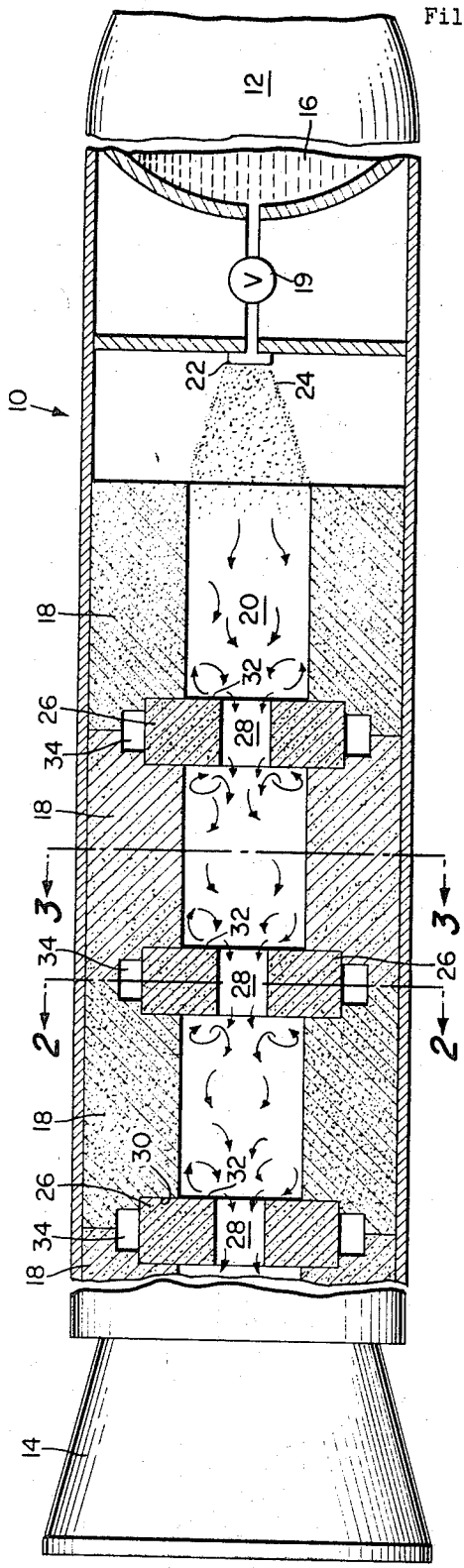
FIGURE 1 of the drawings is a partly sectional view of a hybrid rocket motor designed in accordance with a preferred embodiment of the present invention, and illustrating a plurality of axially-spaced-apart port restrictions designed to produce a complete intermixing of the respective solid and liquid phases prior to emergence of the combustion gases from the exhaust nozzle of the projectile.
Figure 3:
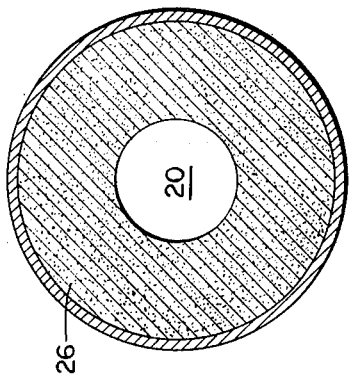
FIGURES 2 and 3 are cross-sectional views of FIGURE 1 taken along the lines 2—2 and 3—3, respectively.
Figure 2:
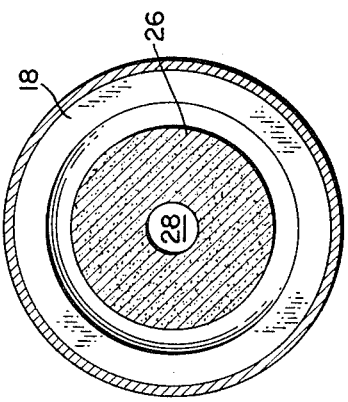

Referring now to the drawing, and particularly to FIG. 1 thereof, there is shown a hybrid rocket of one type to which the present concept is particularly adaptable. This rocket, generally designated in the drawing by the reference numeral 10, is made up of a forward pay-load portion 12 (only a portion of which is illustrated in the drawing) and an aft nozzle 14. Inasmuch as the rocket 10 has been stated to be of the hybrid type, there is included a liquid propellant storage tank 16 and a solid fuel component 18 in the form of a core having an axial opening 20 extending therethrough. When firing of the rocket motor system is desired, a valve 19 is opened to allow the liquid oxidizer in tank 16 to emerge from an injector 22 in the form of a spray 24 which enters into the axial opening or bore 20 formed in the solid fuel member or grain 18. Combustion occurs within the bore region 20, and the products of this combustion, after passing the length of the core, are exhausted from the nozzle 14 thus propelling the rocket.

It has been found in arrangements of the type set forth in FIGURE 1 of the drawings that an incomplete mixing of the liquid oxidizer and the solid fuel occurs within the bore region 20, and that the operating efficiency of the rocket is impaired as a result thereof. In particular, it has been found that a relatively high concentration of oxidizer is located along the axis of the rocket motor and, correspondingly, a relatively high concentration of solid fuel combustion products is formed immediately adjacent the burning surface of the grain 18. Expressed differently, a so-called "boundary layer" of fuel-rich gas exists next to the surface of the grain, and this boundary layer acts in effect as a barrier which prevents the oxidizer from reaching the burning surface of the fuel. The incomplete combustion which results has an adverse effect upon the operating efficiency of the motor.

Higher impulse efficiency and hence improved performance of the rocket motor can be obtained by causing an intimate mixture of the respective propellants within the combustion chamber itself, rather than permitting complete combustion to be delayed to a point where it occurs outside the engine in the rocket exhaust plume. One particularly suitable arrangement for achieving the desired result is by the use of multiple orifices, or port restrictions, as shown in FIGURE 1 of the drawings. These port restrictions are preferably in the form of a plurality of axially-spaced-apart annular rings 26 each of which has a central opening 28 therein the diameter of which is less than the diameter of the bore or axial opening 20 in the solid fuel grain 18. These annular rings 26 are each supported and positioned within recesses 30 cut into the solid fuel number 18 at spaced points therealong, the grain 18 being divided into a number of identical longitudinal segments which can be "stacked" into the outer casing or shell of the rocket motor 10 separately after the annular rings 26 have been inserted between adjoining core portions. A motor of any desired length can thus be assembled in modular form.

Regardless of the manner in which the assembly is carried out, however, it is intended that the annular port restrictions 26 be composed of substantially the same material as that from which the propellant grain 18 is fabricated. One preferred substance for this purpose of polypropylene and another is polymethyl methacrylate.

It will now be recognized that as the liquid oxidizer ejected from the outlet 22 travels down the core 20, it encounters in succession a series of partial barriers formed by the inwardly projetcting shoulders 32 of the annular rings 26. Although a portion of the oxidizer passes through the axial opening 28 in each ring 26, nevertheless the partially-impeded oxidizer flow creates a highly turbulent condition within each core region defined by successive rings, and the resulting partial recirculation of the oxidizer brings about increased oxidizer heating and vaporization. In practice, the flow of propellant through each restricting orifice 28 has been found to be highly turbulent and to consist of an intimate intermixture of both fuel and oxidizer. In addition, the "boundary layer" of fuel-rich gas which was formerly present adjacent the surface of the grain 18 is completely broken up by the turbulent conditions within the core 20 when the annular rings 26 are present, and, consequently, the solid fuel regression rate displays substantial improvement. Although it is usually preferable that the material of which the annular ring 28 is composed be substantially the same as that of the solid fuel member 18, as above stated, it may be desirable under certain conditions for the annular rings or port restrictions 26 to have a regression rate approximately twice that of the solid fuel lying between such port restrictions. This permits the grain geometry to be designed such that a continuous port restriction is present while complete fuel utilization is achieved by simultaneous burn-out of the port restrictions and the remaining fuel grain at the wall of the motor casing. In order to achieve this complete fuel utilization at burn-out, it may be desirable to incorporate in the motor design of FIGURE 1 a void space 34 of annular configuration lying between the outer periphery of each of the annular rings 26 and the inner wall of the motor casing. The purpose of this annular opening 34 associated with each port restriction 26 is, as stated, to permit complete fuel utilization at burn-out and each cavity may be employed or omitted as may be desired without affecting the basic principles on which the disclosed apparatus operates.

Although the dimensions of the various elements of applicant's concept as herein set forth and described will be determined by the conditions under which the rocket is designed to operate, nevertheless one design which has proven to be especially satisfactory in practice utilizes a propellant grain member 18 having an overall axial length of 22 inches and composed of five segmental portions arranged to include four annular rings or port orifices respectively interposed therebetween. Each such annular ring or port orifice possesses an outer diameter of .8" with a central opening of .8" therein. The axial core opening or bore in the propellant grain has a dimension of 2", while each annular ring is spaced 3" longitudinally from the ring or rings lying adjacent thereto. Operation of such a motor shows that the impulse efficiency is raised from a figure in the neighborhood of 78% to approximately 91% without imposing any weight penalty whatsoever. In addition, comparative tests have been made with conventional grain and with one employing the concept of the present disclosure. The following table sets forth the results obtained from one such operation.

| | $\overset{\circ}{W}_f$ (lb./sec.) | $\overset{\circ}{W}_{ox}$ (lb./sec.) | O/F | $G_o$ lb./sec./in.² | $P_c$ (p.s.i.a.) | $t_b$ (sec.) | F (lb.) | $I_{sp}$ |
|---|---|---|---|---|---|---|---|---|
| Conventional grain design | .255 | 1.69 | 6.60 | .557 | 228.0 | 12.41 | 390.3 | 201 |
| Using port restrictions of FIG. 1 | .456 | 1.534 | 3.360 | .487 | 373.5 | 7.44 | 515.0 | 258.8 |

In the above table, $\overset{\circ}{W}_f$ represents the weight of fuel burned in pounds per second, $\overset{\circ}{W}_{ox}$ the weight of oxidizer burned, O/F the oxidizer-to-fuel ratio, $G_o$ the weight in pounds per second of oxidizer fed into the perforation per square inch of perforation cross-sectional area, $P_c$ the chamber pressure, $t_b$ the burning time in seconds, F the developed thrust in pounds, and $I_{sp}$ the specific impulse produced.

It should be noted that the design of the disclosed rocket motor is particularly useful for larger rockets, since the solid fuel propellant is fabricated in sections than can be stacked into the motor separately with the port restrictions inserted therebetween. Furthermore, it is possible to produce an initial high-fuel delivery rate until burn-out of the orifice sections and then a continued combustion with a lower fuel delivery rate.

Obviously many modifications and variations of the present invention are possible in the light of the above teachings. It is therefore to be understood that within the scope of the appended claims the invention may be practiced otherwise than as specifically described.

I claim:
1. In a hybrid rocket incorporating a solid phase propellant in the form of an essentially tubular grain lying within and extending axially of the rocket body, and a liquid phase propellant in the form of an oxidizer injectable into the axial opening in said grain so as to react with said solid propellant and thereby generate propulsive gases for said rocket, the improvement which comprises:
  means for increasing impulshe efficiency and thus enhancing rocket performance by producing an intimate mixture of the respective solid and liquid phase propellants in the reaction region,
  said means being in the form of a plurality of axially spaced-apart rings located within said tubular grain and supported thereby, each ring having a central aperture of lesser diameter than the bore in said grain so as to act as a partial barrier to the flow of gas toward the exhaust nozzle of the rocket, the action of said rings being to create a turbulence within said reaction region which produces a high rate of erosive burning of said grain due to the forced impingement of combustion fluids against the grain surface;

each of said plurality of axially spaced-apart rings being composed of a consumable material having a rate of erosive burning higher than that of said grain so as to result in uniform burn-out of said rings and said grain in said reaction region.

2. A hybrid rocket according to claim 1 in which the rate of erosive burning of each of said rings is approximately twice that of said grain.

References Cited

UNITED STATES PATENTS

| 2,990,682 | 7/1961 | Mullaney | 60—251 |
| 3,315,472 | 4/1967 | Moutet et al. | 60—251 |
| 3,334,489 | 8/1967 | Vilet | 60—251 |

CARLTON R. CROYLE, *Primary Examiner.*

U.S. Cl. X.R.

102—101